United States Patent
Wilgosz

(10) Patent No.: US 9,835,935 B1
(45) Date of Patent: Dec. 5, 2017

(54) TELESCOPING EXTENSION DEVICE FOR CAMERA PHONES

(71) Applicant: Robert Wilgosz, Mantua, NJ (US)

(72) Inventor: Robert Wilgosz, Mantua, NJ (US)

( * ) Notice: Subject to any disclaimer, the term of this patent is extended or adjusted under 35 U.S.C. 154(b) by 0 days.

(21) Appl. No.: 15/621,409

(22) Filed: Jun. 13, 2017

(51) Int. Cl.
*G03B 17/56* (2006.01)
*F16M 13/04* (2006.01)

(52) U.S. Cl.
CPC .......... *G03B 17/561* (2013.01); *F16M 13/04* (2013.01)

(58) Field of Classification Search
CPC ...................................................... F16M 13/04
See application file for complete search history.

(56) References Cited

U.S. PATENT DOCUMENTS

| | | | |
|---|---|---|---|
| 9,609,282 B2 * | 3/2017 | Ohtomo | H04N 7/18 |
| 2005/0051667 A1 * | 3/2005 | Arlton | B64C 27/10 |
| | | | 244/17.11 |
| 2014/0055613 A1 * | 2/2014 | Ohtomo | H04N 7/18 |
| | | | 348/144 |

* cited by examiner

*Primary Examiner* — Clayton E Laballe
*Assistant Examiner* — Linda B Smith
(74) *Attorney, Agent, or Firm* — Stuart M. Goldstein

(57) ABSTRACT

A telescoping extension device for camera phones utilizes an extendable, telescoping pole, a control handle located at the first end of the pole, and a camera phone holder designed to support a camera phone attached at the upper or second end of the pole. A propeller blade assembly, consisting of propeller blades and an electric motor, is attached to the second end of the pole. A propeller blade control switch located on the control handle provides a remote signal to the motor to control the off and on rotation and speed of the blades. By actuating the motor and rotating the blades, a "helicopter" effect is created, resulting in the second end of the pole to be lifted, thereby increasing the photographic field of vision of the camera phone.

6 Claims, 2 Drawing Sheets

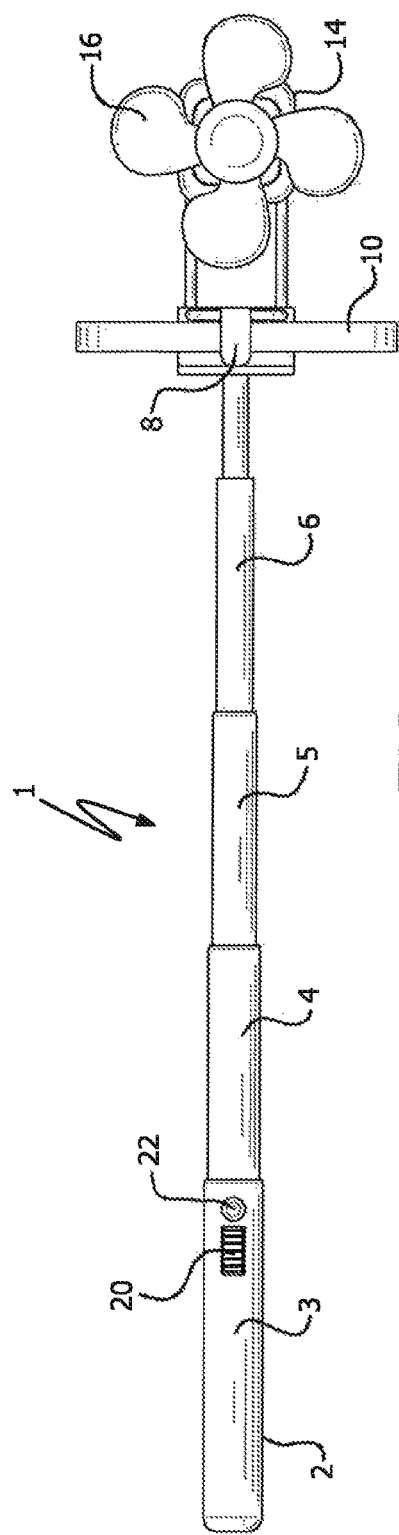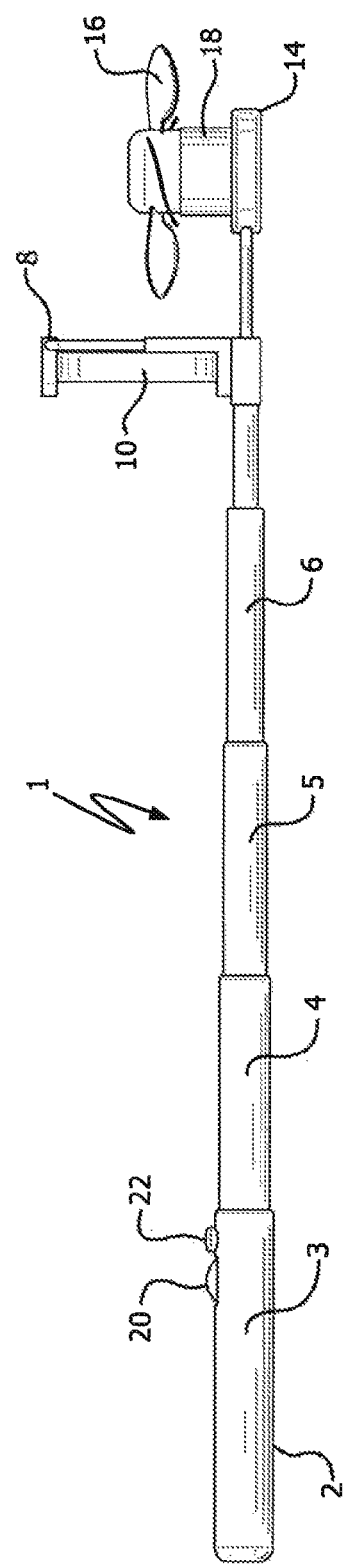

TELESCOPING EXTENSION DEVICE FOR CAMERA PHONES

BACKGROUND OF THE INVENTION

Telescoping camera phone holders, i.e. selfie sticks, have become very popular over the last several years. These devices allow a camera phone to be positioned further from the user before a photograph is to be taken. The increased distance from the user to the camera phone widens the scope or field of photographic vision, resulting in a photograph which shows more of the subject scene.

However, the length of these camera phone holders, even those that are telescopic, are restricted, since the further the user extends the holder, the more unstable and unwieldly it becomes. As a result, current camera phone holders do not extend more than three or four feet, thereby limiting the camera phone's photographic field of vision.

SUMMARY OF THE INVENTION

It is thus the object of the present invention to utilize a "selfie stick" having a standard length or one which is telescopic, but which materially increases the field of photographic vision of the camera phone.

This and other objects are accomplished by the present invention, a telescoping extension device which comprises an extendable, telescoping pole, a control handle located at the first end of the pole, and a camera phone holder designed to support a camera phone attached at the upper or second end of the pole. A propeller blade assembly, consisting of propeller blades and an electric motor, is attached to the second end of the pole. A propeller blade control switch located on the control handle provides a remote signal to the motor to control the off and on rotation and speed of the blades. By actuating the motor and rotating the blades, a "helicopter" effect is created, resulting in the second end of the pole to be lifted, thereby increasing the photographic field of vision of the camera phone.

The novel features which are considered as characteristic of the invention are set forth in particular in the appended claims. The invention, itself, however, both as to its design, construction and use, together with additional features and advantages thereof, are best understood upon review of the following detailed description with reference to the accompanying drawings.

BRIEF DESCRIPTION OF THE DRAWINGS

FIG. 2 is a top view of the telescoping extension device of the present invention.

FIG. 3 is an elevation view of the telescoping extension device of the present invention.

DETAILED DESCRIPTION OF THE INVENTION

Figure 1:
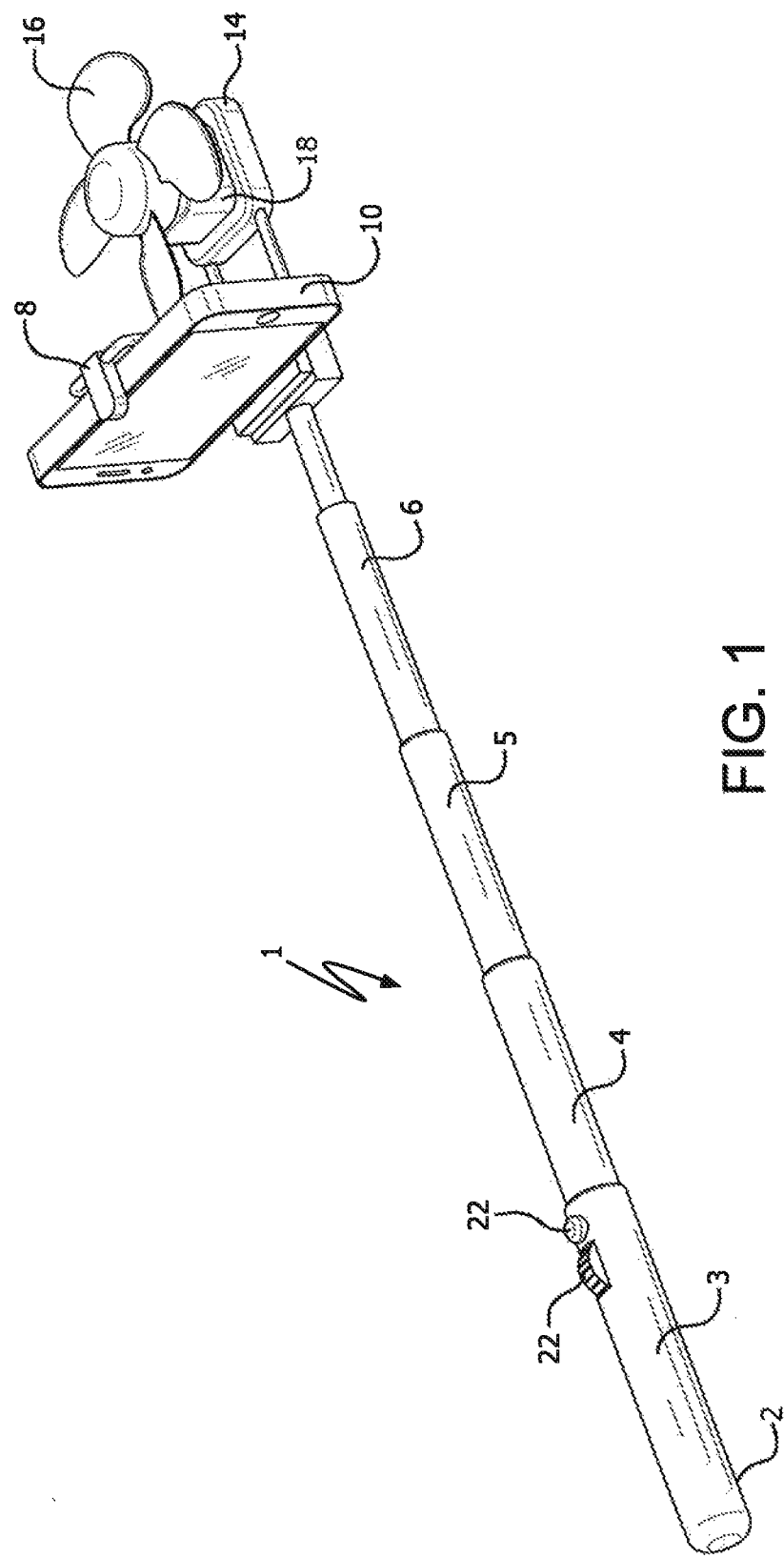
FIG. 1 is a perspective view of the telescoping extension device of the present invention.

Telescoping extension device 1 of the present invention comprises extendable, telescoping pole 2 having extendable sections 4, 5, and 6. Control handle 3 is located at the lower, first end of telescoping pole 2. Camera phone holder 8, configured to support camera phone 10, is attached at the upper or second end of telescoping pole 2.

Propeller blade assembly 14, comprising propeller blades 16 and electric motor 18, is attached at the second end of telescoping pole 2. Propeller blade control switch 20, located on control handle 3, provides a remote signal to electric motor 18 to control the on and off rotation and speed of rotation of propeller blades 16. Camera phone control switch 22, located on control handle 3 as well, actuates and operates camera phone 10 located in camera phone holder 8.

In operation, telescoping pole 2 is extended part way or to its full length, with camera phone 10 secured to camera phone holder 8. Propeller blade control switch 20 is actuated, causing electric motor 18 to power on, thus rotating propeller blades 16. This creates a "helicopter" effect which causes the second end of telescoping pole 2 to be lifted. Camera phone holder 8 with camera phone 10 attached, is lifted along with the second end of telescoping pole 2. The result is a bird's eye view of the user and the surrounding area, providing a wider photographic view for camera phone 10. Camera phone control switch 22 is then actuated, causing the camera phone to take the photograph.

After the photograph is taken, propeller blade control switch 20 is actuated to stop the flow of electricity from motor 18 to blades 16, causing the blades to slowly stop rotating. The second end of telescoping pole 2 lowers. Pole sections 4, 5, and 6 can then be retracted inward and camera phone 10 removed from its holder 8.

It is anticipated that telescoping pole 2 could be extended up to ten feet, by utilizing the present invention. In this regard, the length and rotational speed of the propeller blades should not be considered restricted to that which is described in the herein disclosure. The length and configuration of the blades and their rotational speed will depend on such factors as the weight of the extension device and the number of extendable pole sections. These factors will be determinative of the blade design and speed required to provide the upward force necessary to lift the telescoping pole.

Certain novel features and components of this invention are disclosed in detail in order to make the invention clear in at least one form thereof. However, it is to be clearly understood that the invention as disclosed is not necessarily limited to the exact form and details as disclosed, since it is apparent that various modifications and changes may be made without departing from the spirit of the invention.

The invention claimed is:

1. A telescoping extension device for taking photographs with a portable camera phone, said extension device comprising:
   an extendable, telescoping pole having first and second ends;
   a control handle located at the first end of the telescoping pole;
   a camera phone holder for supporting a camera phone, said holder attached to the second end of the telescoping pole;
   rotating propeller blades attached to the second end of the telescoping pole, adjacent to the camera phone holder;
   camera phone control switch means for operating the camera phone; and
   propeller blade control switch means for controlling the on or off rotation and speed of the propeller blades, whereby when the blades are rotating, the second end of the telescoping pole and the camera phone holder is lifted upwards.

2. The extension device as in claim 1 wherein the propeller blades are rotatably powered by an electric motor.

3. The extension device as in claim 2 wherein the propeller blades switch means remotely controls the speed of the electric motor, in order to control the rotational speed of the propeller blades.

4. The extension device as in claim 1 wherein the camera phone control switch means is located on the control handle.

5. The extension device as in claim 1 wherein the propeller blade control switch means is located on the control handle.

6. The extension device as in claim 4 wherein the propeller blade control switch means is located on the control handle.

\* \* \* \* \*